United States Patent
Perkins

[11] Patent Number: 5,192,390
[45] Date of Patent: Mar. 9, 1993

[54] MANDREL MEANS

[75] Inventor: David J. B. Perkins, Liverpool, United Kingdom

[73] Assignee: Bridgestone/Firestone Inc., Arkon, Ohio

[21] Appl. No.: 771,883

[22] PCT Filed: Nov. 14, 1988

[86] PCT No.: PCT/GB88/00989
§ 371 Date: May 1, 1990
§ 102(e) Date: May 1, 1990

[87] PCT Pub. No.: WO89/04756
PCT Pub. Date: Jun. 1, 1989

Related U.S. Application Data

[63] Continuation of Ser. No. 474,133, May 1, 1990.

[30] Foreign Application Priority Data

Nov. 13, 1987 [GB] United Kingdom ............ 8726665

[51] Int. Cl.⁵ ........................................ B65H 81/00
[52] U.S. Cl. .......................... 156/425; 156/117; 156/124; 156/174; 156/184; 156/429; 156/494
[58] Field of Search ............ 156/117, 124, 137, 138, 156/139, 174, 184, 250, 425, 429, 494, 495, 496; 83/177

[56] References Cited

U.S. PATENT DOCUMENTS

| | | | |
|---|---|---|---|
| 1,924,067 | 8/1933 | Gertenslager | 156/139 X |
| 3,748,203 | 7/1973 | Greene | 156/117 X |
| 3,885,594 | 5/1975 | Tanaka | 138/129 |
| 4,092,889 | 6/1978 | Fisher | 83/177 |
| 4,137,804 | 2/1979 | Gerber et al. | 83/177 |
| 4,600,456 | 7/1986 | Oswald | 156/117 |

Primary Examiner—Caleb Weston
Assistant Examiner—James J. Engel, Jr.
Attorney, Agent, or Firm—Sughrue, Mion, Zinn, Macpeak & Seas

[57] ABSTRACT

Mandrel means for forming tubular tubular articles of an infinitely variable range of sizes by helical winding of strip material (25) around the mandrel means comprises a support surface defined by an endless belt (37) which extends around two support drums (36) the spacing of which is selectively variable. The mandrel means additionally comprises a belt guide assembly (38) (39) which preferably diverts the belt (37) to follow an inwardly extending path between the support drums (36) and thereby results in a peripheral discontinuity in the mandrel means support surface. The belt guide assembly may also incorporate a roller (39) to maintain tension in the belt (37) irrespective of the spacing of the support drums (36). Cutter means may be provided to cut a wound tubular article in the vicinity of the support surface discontinuity.

18 Claims, 4 Drawing Sheets

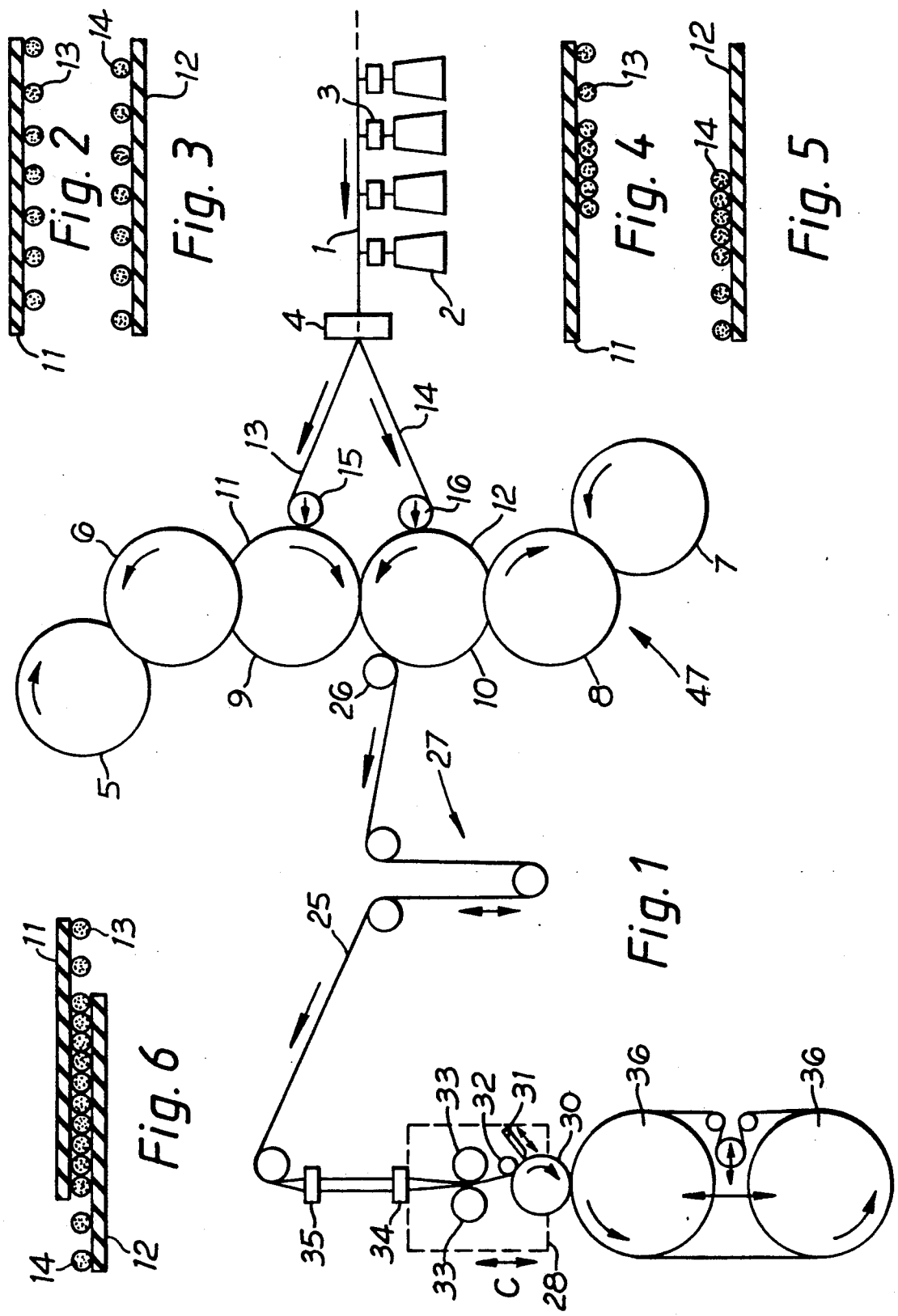

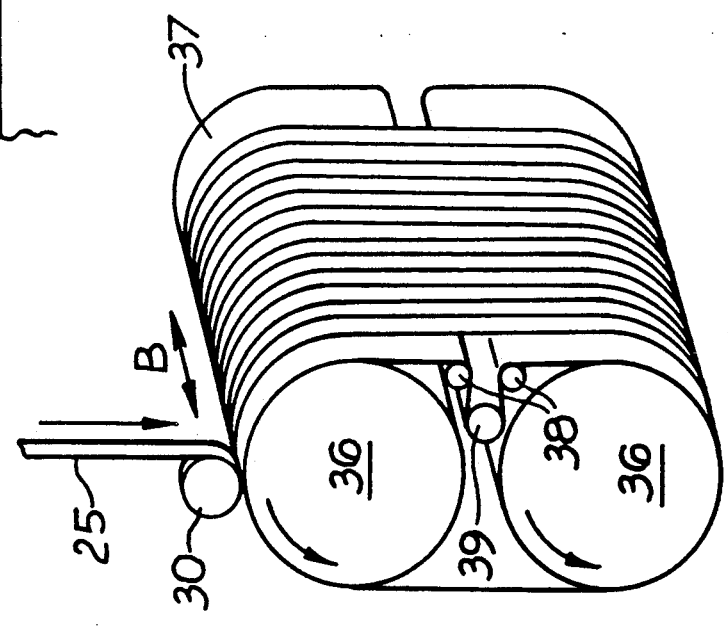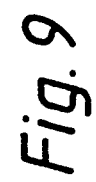

MANDREL MEANS

This is a continuation of application Ser. No. 07/474,133 filed May 1, 1990.

This invention relates to a mandrel means and in particular, although not exclusively, to a mandrel means suitable for use in the manufacture of reinforced ply fabric material of a kind utilised in the manufacture of radial or cross ply pneumatic tires. The invention relates also to a mandrel means suitable for the production of a tubular article.

To produce tubular articles of a range of sizes by conventional techniques involving the use of a mandrel has the disadvantage that it is necessary to have available a range of mandrels of correspondingly-related sizes. Apart from the cost associated with the need to provide a number of mandrels there is the disadvantage of the not insignificant time needed for interchanging mandrels when it is decided to change the size of article being produced. Furthermore, the sizes of tubular article produced by the conventional technique is not infinitely variable but is restricted to a size related to that of one of the mandrels.

Particularly in the precision manufacture of certain types of flexible reinforced polymeric articles, such as pre-sized sheets of ply fabric material for use in automatic techniques for construction pneumatic tires, it is desirable to be able to control and also selectively vary the size of the article within close tolerances.

The present invention seeks to provide mandrel means which readily facilitates small changes in the size of an article produced with the aid of the mandrel means.

In accordance with one of its aspects the present invention provides a mandrel means comprising at least two support drums rotatably mounted for rotation about respective axes the relative spacing of which is selectively variable to vary the length of a peripheral path defined at least in part by said drums, an endless support belt which extends around said drums to define at least in part a mandrel support surface, and a belt guide means comprising a belt control device movable relative to said drums and in engagement with the belt whereby the effective peripheral length of said mandrel support surface is variable in response to change of relative spacings of said support drums.

The belt control device may be movable to maintain a tension, preferably a substantially constant tension, in the endless belt for any of a range of relative spacings of said support drums. The belt control device may be of a kind incorporating a spring-loaded member or like component which serves to maintain tension automatically without the need for adjustment upon change of relative spacing of said support drums.

Preferably the belt guide means is a belt guide means assembly of a kind arranged to guide the belt whereby it defines a peripherally discontinuous mandrel support surface.

More preferably the belt guide means is an assembly comprising a pair of guide rollers which divert the belt to follow an inwardly extending path between the support drums and a belt control device in the form of a tension roller for engaging a portion of belt between said guide rollers, the tension roller being movable relative to said guide rollers and support drums to maintain tension in the belt for any of a range of relative spacings of said support drums.

The endless belt may be of inextensible material and preferably is formed of reinforced polymeric material such as a rayon reinforced synthetic rubber material.

In mandrel means in which the endless belt defines a peripherally discontinuous mandrel support surface the region of the discontinuity in the mandrel support surface may be employed to locate cutter means if it is desired to cut into a sheet a tubular article constructed on the mandrel means. In such constructions the mandrel means may comprise a cutter control device operable to control movement of a cutter means. The cutter control device may, for example, cause the cutter means to operate only when the belt is not moving, or to move relative to the length of the mandrel means at a speed related to the speed of movement of the belt if it is desired to attain, for example, an obliquely extending cut.

The mandrel means additionally or alternatively may comprise an applicator control device to control the supply of material to the mandrel means, for example to control the supply of an elongate reinforced strip from a tape applicator to the mandrel means for helical winding around the mandrel means.

The invention also provides that the mandrel means may comprise lifting means such as a gas jet located in the region of the discontinuity in the mandrel support surface and operable to lift relative to the mandrel means a cut edge of an initially tubular article formed on said mandrel means.

An embodiment of a mandrel means in accordance with the present invention will now be described by way of example in connection with the manufacture of textile ply fabric for the production of a radial ply tire with reference to the accompanying diagrammatic drawings, in which:

FIG. 1 is a view of apparatus for forming tire fabric,

FIG. 2 is a sectional view of one form of the upper half of a tape,

Figure 10:
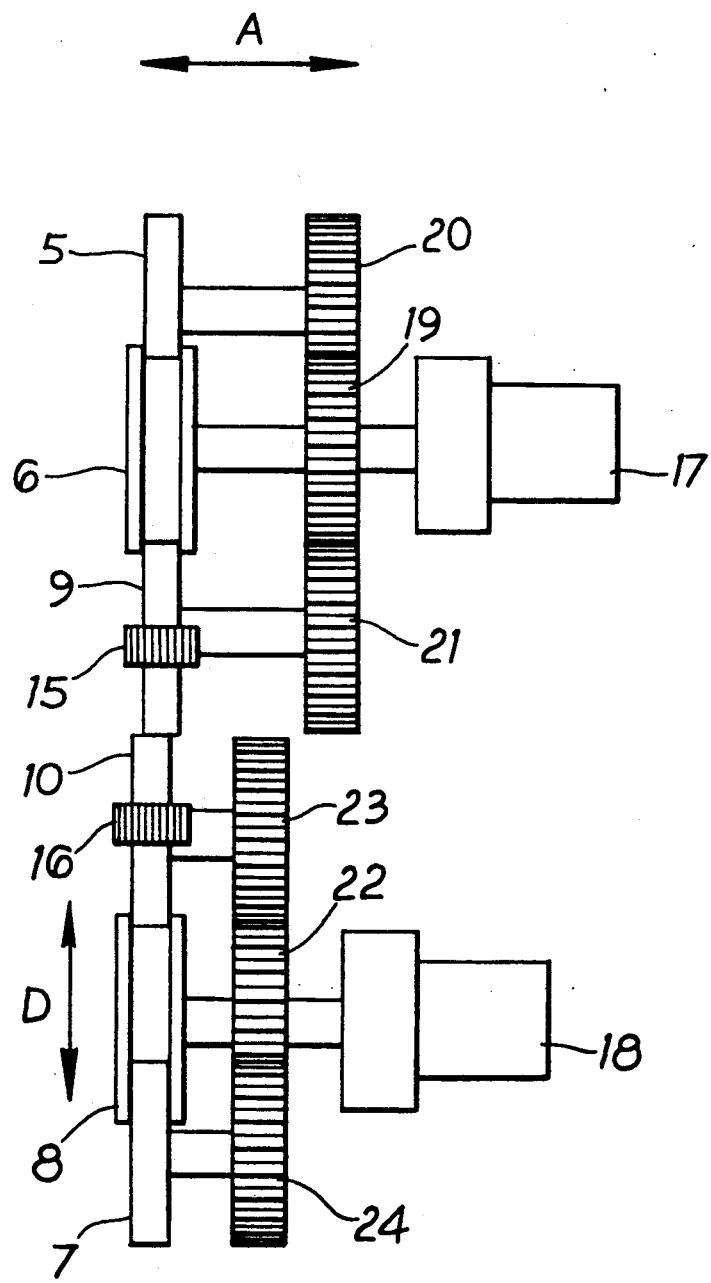
Figure 12:
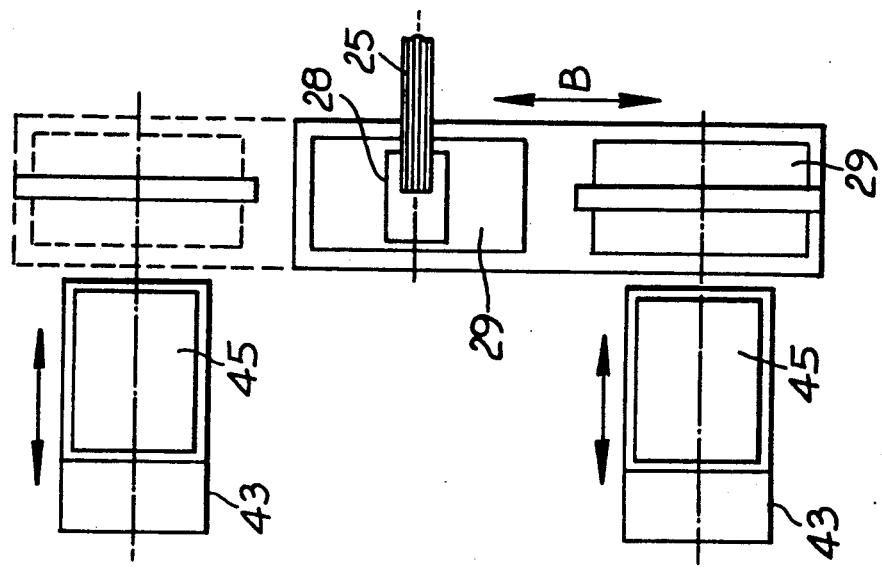
Figure 11:
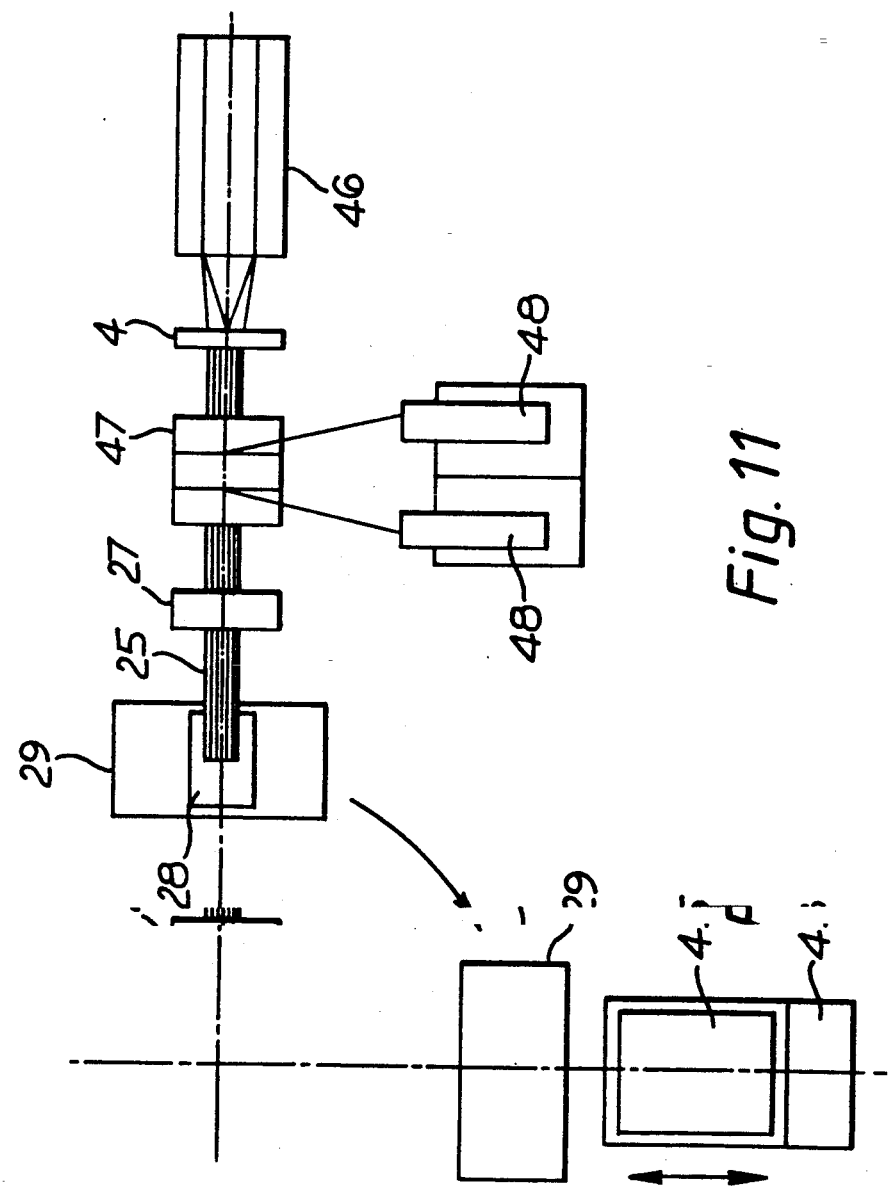

FIG. 3 is a sectional view of the lower half of a tape which is complimentary to the top half shown in FIG. 2, FIG. 4 is a sectional view of another form of the upper half of a tape, FIG. 5 is a sectional view of the lower half of a tape which is complimentary to the top half shown in FIG. 4, FIG. 6 is a sectional view of the composite consolidated tape produced by both forms shown in FIGS. 2, 3, 4 and 5, FIG. 7 is an isometric view of a mandrel means in accordance with the present invention showing a completed tubular winding of tape, FIG. 8 is a longitudinal sectional view of the final tubular ply fabric envelope as it appears on the mandrel means showing the special ends produced by use of a tape in the form shown in FIG. 6, FIG. 9 is a view of the mandrel means at the ply cutting and removal station showing a cutter and clamps for gripping the ply on the carriage, prior to removal of the ply from the mandrel means, FIG. 10 is a view of a six-roll calender looking downstream and showing means of adjusting the width of tape and means of adjusting the final guage of the tape, FIG. 11 is a plan view of the apparatus showing that the winding station and the ply cutting/removal station may be part of a turret which may consist of one or more winding and ply cutting/removal stations, and FIG. 12 is a plan view of an alternative layout showing a shuttle system, whereby one tape producing apparatus winds tape onto one or other of two mandrel means fitted to a carriage which is able to shuttle from one ply cutting/removal station to another.

Referring first to FIGS. 1-4, FIG. 1 shows a diagrammatic view of apparatus in which pre-treated cords 1 are fed from cheeses or cones 2 in a creel 46 (shown in FIG. 11) through individual tensioning units 3 to a cord collecting frame 4.

At this point the cords may be divided into two sets of cords of many different configurations, prior to being fed into the central nip of a six-roll calender 47 (shown in more detail in FIG. 11). Rubbery compound produced by two small cold feed extruders 48 (see FIG. 11) is introduced in rod form into the calender at two locations: firstly between calender rolls 5 and 6 and secondly between rolls 7 and 8 (see FIG. 1).

A small rolling bank of compound (not shown) is maintained between rolls 6 and 9 and between rolls 8 and 10, these paired rolls respectively producing the upper 11 and lower 12 films of rubber for the construction of the tape.

Rolls 5, 7, 9 and 10 are male rolls which fit closely inside the female rolls 6 and 8. The rolls are constructed in such a manner that changes in width can quickly be achieved and bearing housings for the rolls are mounted in such a way that rubber guages can be changed easily.

An upper set of cords 13 from the collecting frame 4 passes over grooved guide and pressure roller 15, which embeds the cords into the rubber veneer 11 against the calender roll 9. Similarly a lower set of cords 14 from the collecting frame 4 passes over a grooved guide and pressure roller 16 which embeds the cords into the rubber veneer 12 against the calender roll 10.

The upper and lower sets of cords 13 and 14, respectively, are so arranged as to be complimentary to each other. For example, they may be arranged as shown in FIGS. 2 and 3, or FIGS. 4 and 5, or in a variety of other ways including those described in our aforementioned copending United Kingdom Patent Application of even date entitled "Flexible Reinforced Polymeric Material".

If either of the configurations shown by FIGS. 2-5 are used the final form of the tape appears as shown in FIG. 6, with the upper and lower rubber veneers 11, 12 transversely offset. The staggering of the upper and lower veneers 11, 12 is achieved by offsetting the upper half of the calender with respect to the lower half, as shown in FIG. 10. This offset is important in order to achieve the "jointless" ply construction.

The upper half of the calender, consisting of rolls 5, 6 and 9, is able to move sideways as indicated by arrow A of FIG. 10 in order to achieve the offset. Geared motors 17 and 18 drive the upper and lower halves of the calender through respective gear sets 19, 20 and 21 and 22, 23 and 24. The final nip between rolls 9 and 10 is adjustable by movement of the lower half of the calender in the direction of arrow D in order to achieve the desired thickness of the resulting composite ply fabric tape 25. The ply fabric tape 25 is stripped off roll 10 by a contact roller 26 and then passes through a festoon 27, which controls the speed of the calender. The tape 25 is then fed to a tape applicator 28 which is able to traverse in the direction of arrow B of FIG. 12 across the face of a mandrel means, hereinafter referred to as a mandrel 29, parallel to its axis, by means of a driven leadscrew (not shown).

The tape applicator 28 may be raised and lowered as shown by the direction of arrow C in FIG. 1 and contains a laying/pressure roller 30, a cutter unit 31, gripping roller 32 and guide rollers 33. Also mounted on the tape applicator 28 are a pair of guide rollers 34 which, together with a similar pair of rollers 35 mounted on a fixed frame (not shown) positioned above and at a suitable distance from the lower rollers, turn the tape through 90 degrees in order to accommodate the oscillation of the applicator across the face of the winding member in the direction of arrow B.

The leading end of the tape 25 is laid onto the winding surface of mandrel 29 by lowering the applicator 28 so that the laying/pressure roller 30 makes contact with the winding surface. The speed of rotation of the winding surface, the advancement of the applicator carriage and the width of the tape are predetermined so as to give the correct amount of overlap of tape at each turn and the correct length of the envelope across the surface of the mandrel.

At the end of the run of tape 25 the mandrel stops in such a position that the end of the tape, when severed and laid on the surface, aligns axially with the start of the tape. The envelope of the wound tape is transverse on the mandrel and is shown in cross section in FIG. 8.

The mandrel 29 comprises two drums 36. An endless belt 37 (see FIGS. 7 and 9) is fitted around the two drums 36 and passes around a belt guide means assembly in the form of a take-up station consisting of two idler rollers 38, a tension roller 39 and an air flotation unit 40. The tension roller 39 is mounted in a spring-loaded device whereby the roller serves to maintain substantially constant tension in the belt irrespective of change of spacing of the support drums.

A complete range of ply widths, measured along the cords 1, may thus be obtained by suitable selection of drum centre distances.

At the ply cutting and removal station a driven circular knife 41 is brought into a position (see FIG. 9) at which it cuts through the ply envelope at an angle equal to the tape helix angle to give a 90 degree cut to the cord line.

During the cutting operation high pressure air is introduced to the flotation unit 40 to produce a gas (air) jet which raises the lip of the ply material. This unit is used with low pressure air for the initial transfer of the leading end of the tape across the gap in the belt at commencement of helical winding. Having cut a plurality of ply pieces the cutter may retract to its parked position 42 and a ply removal carriage 43 (see FIGS. 9, 11 and 12) moves into position under the mandrel.

A set of clamps 44 mounted on the carriage 43 grips the edge of the ply material and pulls the ply off the mandrel as the carriage moves outwards. During this operation the ply material is accurately positioned onto a component carrier 45 on which the ply is transported to the building drum of a tire building machine.

It will be appreciated from the above description that the present invention facilitates a rapid change and infinite adjustment of the size of fabric produced on the mandrel. Thus in the case, for example, of fabric for use in applying to e.g. a tire building former rapid change is possible by varying the total width of reinforcing tape wound helically around the mandrel and by adjusting the peripheral dimension of the mandrel.

I claim:

1. Mandrel means; at least two support drums rotatably mounted for rotation about respective axes the relative spacing of which is selectively variable to vary the length of a peripheral path defined at least in part by said drums, a belt guide means assembly, an endless support belt which extends around said drums and belt guide means assembly and which defines at least in part a mandrel support surface, said belt guide means assembly comprising a pair of guide rollers arranged to divert the endless belt to follow an inwardly extending path between the support drums and thereby result in a peripheral discontinuity of the mandrel support surface, and said belt guide means assembly additionally comprising a belt control device to engage and maintain tension in the belt for any of a range of relative spacings of said support drums, and applicator means arranged for traversing movement across the width of the endless belt for applying strip material to the endless belt during movement of the endless belt around the drums whereby the strip material is caused to extend helically relative to said axes of rotation of the support drums.

2. Mandrel means; at least two support drums rotatably mounted for rotation about respective axes the relative spacing of which is selectively variable to vary the length of a peripheral path defined at least in part by said drums, an endless support belt which extends around said drums to define at least in part a mandrel support surface, belt guide means comprising a belt control device movable relative to said drums and in engagement with the belt whereby the effective peripheral length of said mandrel support surface is variable in response to a change of relative spacing of said support drums, and applicator means arranged for traversing movement across the width of the endless belt for applying strip material to the endless belt during movement of the endless belt around the drums whereby the strip material is caused to extend helically relative to said axes of rotation of the support drums.

3. Mandrel means as claimed in claim 2, wherein the belt control device is movable to maintain a tension in the endless belt for any of a range of relative spacings of said support drums.

4. Mandrel means as claimed in claim 3, wherein the belt control device (39) is movable to maintain a substantially constant tension in the endless belt.

5. Mandrel means as claimed in claim 3, wherein the belt control device is operable to maintain tension in the belt automatically upon change of relative spacing of said support drums.

6. Mandrel means as claimed in claim 2, wherein said belt guide means is a belt guide means assembly which guides the endless belt to define a peripherally discontinuous mandrel support surface.

7. Mandrel means as claimed in claim 6, wherein the belt comprises reinforced polymeric material and the belt guide means assembly comprises a pair of guide rollers arranged to divert the endless belt to follow an inwardly extending path between the support drums.

8. Mandrel means as claimed in claim 7, wherein the belt guide means assembly comprises a belt control device to engage and maintain tension in the endless belt for any of a range of relative spacings of said support drums.

9. Mandrel means as claimed in claim 8, wherein the belt control device engages an inward portion of the endless belt lying between the guide rollers.

10. Mandrel means as claimed in claim 9, wherein the belt control device (30) is a roller movable relative to at least one of said support drums.

11. Mandrel means as claimed in claim 1 wherein it comprises a cutter control device operable to control movement of a cutter means in the region of the discontinuity in the mandrel support surface.

12. Mandrel means as claimed in claim 11, wherein the cutter control device is operable to cause cutter means to move at a speed related to the speed of movement of the belt.

13. Mandrel means as claimed in claim 11, and wherein it comprises lifting means located in the region of the discontinuity in the mandrel support surface and operable to lift relative to the mandrel surface a cut edge of an initially tubular article formed on said mandrel means.

14. Mandrel means as claimed in claim 13, wherein said lifting means comprises a gas jet.

15. Mandrel means as claimed in claim 1, wherein said belt control device (39) engages an inward portion of the endless belt (37) lying between the guide rollers (38).

16. Mandrel means as claimed in claim 1, wherein the belt control device (39) is a roller movable relative to at least one of said support drums (36).

17. Mandrel means as claimed in claim 3, wherein the belt control device (39) is a roller movable relative to at least one of said support drums (36).

18. Mandrel means as claimed in claim 8, wherein the belt control device (39) is a roller movable relative to at least one of said support drums (36).

* * * * *